United States Patent
Savelli et al.

(10) Patent No.: US 10,805,922 B2
(45) Date of Patent: Oct. 13, 2020

(54) METHOD FOR TRANSMITTING A SEQUENCE OF SETS OF DATA FROM A COMMUNICATION DEVICE TO AN ACCESS POINT

(71) Applicant: ABEEWAY, Meylan (FR)

(72) Inventors: Patrick Savelli, Rennes (FR); Mikaël Guenais, Rennes (FR)

(73) Assignee: ABEEWAY, Meylan (FR)

( * ) Notice: Subject to any disclaimer, the term of this patent is extended or adjusted under 35 U.S.C. 154(b) by 0 days.

(21) Appl. No.: 15/737,921

(22) PCT Filed: Jun. 26, 2015

(86) PCT No.: PCT/IB2015/001311
§ 371 (c)(1),
(2) Date: Dec. 19, 2017

(87) PCT Pub. No.: WO2016/207681
PCT Pub. Date: Dec. 29, 2016

(65) Prior Publication Data
US 2018/0167937 A1    Jun. 14, 2018

(51) Int. Cl.
*H04W 72/04*    (2009.01)
*H04W 52/02*    (2009.01)
(Continued)

(52) U.S. Cl.
CPC ......... *H04W 72/0426* (2013.01); *H04L 1/203* (2013.01); *H04W 28/0247* (2013.01);
(Continued)

(58) Field of Classification Search
CPC ............ H04B 17/345; H04W 28/0247; H04W 28/0268; H04W 52/0254; H04W 52/221;
(Continued)

(56) References Cited

U.S. PATENT DOCUMENTS 6,845,246 B1 * 1/2005 Steer ................... H04W 52/283
455/522
8,289,874 B1 * 10/2012 Singh ................... H04B 17/345
370/229

(Continued)

FOREIGN PATENT DOCUMENTS

EP    2 866 509 A1    4/2015
WO    2009/131502 A1    10/2009

OTHER PUBLICATIONS

Mar. 15, 2016 Search Report issued in International Patent Application No. PCT/IB2015/001311.
(Continued)

*Primary Examiner* — Harun Chowdhury
(74) *Attorney, Agent, or Firm* — Oliff PLC

(57) ABSTRACT

The disclosure relates to transmitting a sequence of sets of data, from a communication device to an access point of a wireless communication network, through at least one radio communication channel to improve radio communication quality to cope with environmental condition changes and/or location changes of the communication device and/or changes of usage of the communication device in terms of mobility. For each set of data, a value of at least one parameter to be used by the communication device for transmission is determined by selecting, in a list of predetermined values of parameters, a corresponding value. The number of occurrences of each predetermined value is determined according to a probability that the selection leads to a transmission of data with at least one quality criteria fulfilling at least one predefined condition. Each set of data is then transmitted according to the value of said at least one parameter.

13 Claims, 4 Drawing Sheets

Figure 1:
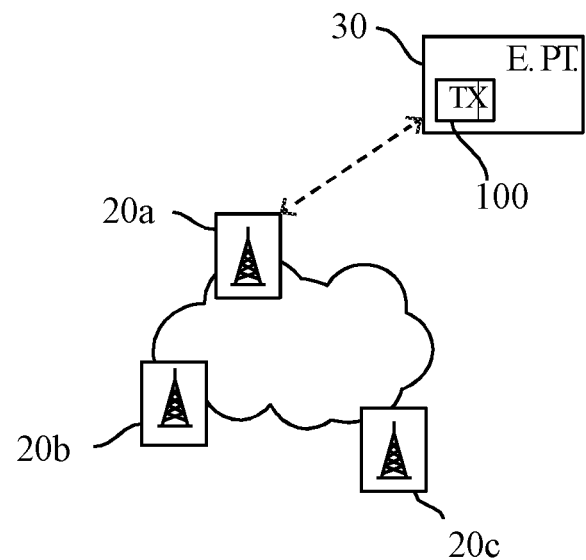

(51) Int. Cl.
  *H04L 1/20* (2006.01)
  *H04W 28/02* (2009.01)
  *H04W 72/08* (2009.01)
(52) U.S. Cl.
  CPC ... *H04W 28/0268* (2013.01); *H04W 52/0254* (2013.01); *H04W 72/0413* (2013.01); *H04W 72/085* (2013.01); *Y02D 70/00* (2018.01)
(58) Field of Classification Search
  CPC .. H04W 52/283; H04W 72/0426; H04L 1/203
  USPC .......................... 370/229, 252, 328; 455/522
  See application file for complete search history.

(56) References Cited

U.S. PATENT DOCUMENTS

2005/0249149 A1* 11/2005 Kasturi ............... H04W 52/221
                                                           370/328
2007/0207730 A1    9/2007 Nguyen et al.

OTHER PUBLICATIONS

Mar. 15, 2016 Written Opinion issued in International Patent Application No. PCT/IB2015/001311.

\* cited by examiner

METHOD FOR TRANSMITTING A SEQUENCE OF SETS OF DATA FROM A COMMUNICATION DEVICE TO AN ACCESS POINT

The present invention generally relates to transmissions of data in a wireless communication network. More particularly, the invention relates to uplink transmissions of data, from a terminal to a gateway, in a wireless communication network, where the terminal has no prior knowledge of the uplink radio conditions (e.g. signal to noise ratio, or power, of a signal received by the gateway).

A wireless communications network comprises generally access points—such as gateways—and a plurality of endpoint devices. Typically, an endpoint device is a terminal adapted to access the communication network by establishing a radio communication link with one of the access points. The radio communication link comprises typically a radio uplink, i.e. a transmission path from the endpoint device to an access point, and a radio downlink, i.e. a transmission path from an access point to the endpoint device. Each radio communication link uses one or a plurality of radio channels shared out among the plurality of endpoint devices.

In a wireless communication network, in order to adapt to changing radio conditions affecting the radio communication links, endpoint devices are generally capable of adapting the output power of their radio transmissions and using different spreading factors to control their use of bandwidth. Consequently, these adaptations allow optimizing the overall network capacities and the quality of the radio communication links—which can be evaluated using various performance measurements and according to predefined criteria, such as a frame error rate of communications or an actual energy consumption of the device. Contrary objectives and subsequent trade-offs have to be taken into consideration while optimizing the quality of the radio communication link. In particular, the link budget—related to the amount of radio signal attenuation due to propagation—should be high enough to allow the signal emitted by the endpoint to be demodulated by the access point. The channel should be used during the shortest period possible. The endpoint devices should use the lowest transmission power or spreading factor, such as to minimize the power consumption of the endpoint devices.

However, when an endpoint device has to send data to other devices accessible through the wireless communication network, such as an access point, said endpoint device has generally no prior knowledge of the uplink and/or downlink radio conditions, such as a signal to noise ratio or a power measurement of signals received by the access point. This configuration is generally referred to as an open loop configuration.

To address the issues mentioned above, it is known to deploy wireless communication networks in configurations called closed loop power and/or spreading factor adaptation configurations. In wireless communication networks of this type, the access point tries to demodulate the signal sent by an endpoint device without any knowledge of the current radio conditions. If the signal-to-noise ratio of said signal is too high, then the access point sends commands to the endpoint devices to reduce its output power or spreading factor down to the lowest possible level, while still maintaining a sufficient signal-to-noise ratio. Alternatively, if the signal-to-noise ratio of said signal is too low to ensure establishing a reliable communication link, then the access point sends commands to the endpoint devices to increase its output power or spreading factor. To achieve an optimized setting of the output power and/or spreading factors, frequent exchanges between the access point and the endpoint device are required. These exchanges consume network resources, especially when the radio conditions are continuously evolving.

Other wireless communication networks are deployed according to configurations called static or semi-static power or spreading adaptation configurations, in which endpoint devices are located in fixed geographical positions. In wireless communication networks of this type, the radio propagation conditions between a fixed location endpoint and an access point are subject to limited variations, mainly caused by fading which has a limited impact on the overall radio conditions. The access point can send commands to the endpoint devices to adapt their output power or spreading factor only infrequently, for instance every month. As already underlined, endpoint devices are supposed to stay in fixed locations: if an endpoint device is moving—for instance if said endpoint device is bound to a person or a car, the communication link cannot be guaranteed anymore since the radio propagation conditions constantly change.

Another known solution is to provide each access point adapted to send a fixed beacon signal, the power of which being known. As the radio propagation conditions are symmetric between an endpoint device and the access point, it is possible to compute, from a measurement of the power of the beacon signal received by the endpoint device, an adequate output power and/or spreading factor. However, this solution is limited to wireless communication networks where access points are capable of sending such beacon signal and where said endpoints are capable of receiving and processing such beacon signal.

It is therefore desirable to provide a solution for transmitting data, from a communication device to an access point of a wireless communication network, through at least one radio communication channel, while maximizing the QoS (Quality of Service; for instance the Frame Error Rate or the power consumption), without having access to information relating to the uplink radio conditions. More particularly, it is desirable to provide such a solution, wherein there is no need to establish a downlink radio communication channel from the access point to the communication device. More particularly, it is desirable to provide a solution that aims at improving radio communication quality between the communication device and the access point, in order to cope with environmental condition changes and/or location changes of the communication device and/or changes of usage in terms of mobility.

To that end, according to a first aspect, the present invention concerns a method for transmitting a sequence of sets of data, from a communication device to an access point of a wireless communication network, through at least one radio communication channel. The method comprises: for each set of data, determining a value of at least one parameter to be used by the communication device for transmission of said set of data; and transmitting said set of data, through the at least one radio communication channel, according to the value of said at least one parameter. The method further comprises: for each set of data, said at least one value is determined by selecting, according to the order of said set of data in the sequence, in a list of predetermined values of said at least one parameter, a corresponding value. Furthermore, the number of occurrences of each predetermined value in the list is determined according to a probability that the selection of said predetermined value leads to a transmission of a set of data with at least one quality criteria fulfilling at least one predefined condition.

The method allows transmitting data, while maximizing the QoS (Quality of Service; for instance the Frame Error Rate or the power consumption), without having access to information relating to the uplink radio conditions, and wherein no downlink radio communication channel establishment is needed.

The invention does not intend to define optimal uplink parameters for each set of data, but, instead, to ensure that a good performance trade-off is achieved on average. Consequently, the method can be advantageously executed by communication devices that need to send data packets in a wireless mode to a network, without prior knowledge of the uplink radio conditions (e.g. signal to noise ratio or power of the signal received by the network), and without any information provided by the network on the downlink path relating to these uplink radio conditions. The invention can be advantageously executed by low power radio networks for the Internet of Things, by a connected object that periodically needs to report information, such as sensors, small geo tags, devices used for tracking applications, and more generally on any endpoint devices having constraints on energy consumption. Such a method thus allows improving radio communication quality between the communication device and the access point, in order to cope with environmental condition changes and/or location changes of the communication device and/or changes of usage in terms of mobility.

According to a particular feature, the method further comprises updating the list of predetermined values of said at least one parameter, upon a change of the geographical position of the communication device, and/or upon reception of update information related to said at least one parameter transmitted by the access point and/or by any other device coupled to the wireless communication network. Thus, it is possible to take into consideration a priori propagation statistics for a moving communication device, and optimize said at least one parameter based on the new location of the communication and/or according to modification of the propagations characteristics of the wireless communication network as reported by the access point and/or by any other device coupled to the wireless communication network.

According to a particular feature, the list of predetermined values of the at least one parameter is obtained from a storage means of the communication device, in which the list has previously been stored during a manufacturing process and/or a configuration operation of the communication device. Thus, without having access to information relating to the uplink radio conditions, the communication device can transmit data in an optimized way, directly on start-up, without any further initialisation phase.

According to a particular feature, the list of predetermined values of the at least one parameter is built by: determining a set of possible values of the at least one parameter; for each possible value of the at least one parameter, computing a probability that the use of said possible value leads to a transmission of data, with at least one quality criteria fulfilling at least one predefined condition; for each possible value of the at least one parameter, determining a number of occurrences in the list depending on said probability. The list can be built with all the possible values sorted according to a round-robin algorithm or according to their respective numerical values.

According to a particular feature, for each possible value of the at least one parameter, the probability is computed using information related to the at least one quality criteria observed in various locations of the environment of the wireless communication network and/or determined for various locations of the environment of the wireless communication network. Thus, it is possible to optimize the transmission while taking into consideration the actual radio conditions observed in various locations of the environment of the wireless communication network and/or determined for various locations of the environment of the wireless communication network.

According to a particular feature, the various locations of the environment of the wireless communication network are chosen according to the likelihood that the communication device will be positioned in said locations. It is thus possible to optimize the transmission according to different types of communication devices having different characteristics and coupled to different objects or persons (a pet, a bicycle, humans, cars, etc.).

According to a particular feature, for each possible value of the at least one parameter, the probability is computed based on: the number of locations of the environment of the wireless communication network where said possible value leads to a transmission of data, with said at least one quality criteria fulfilling the at least one predefined condition; and, the total number of the various locations where the information was observed and/or determined.

According to a particular feature, the at least one predefined condition relates to the output power of the communication device. It is therefore possible to maximize a QoS indicator while taking into account the power consumption of the communication, allowing the method to perform acceptable trade-offs. Hence, this advantage is particularly useful for communication devices powered by an autonomous limited energy source (battery powered devices for example).

According to a particular feature, the at least one predefined condition relates to information related to an error rate of transmissions of data from the communication device to the access point.

According to a particular feature, the value of at least one parameter to be used by the communication device for transmission of said set of data relates to a spreading factor to be used by the communication device to convert data into modulation symbols.

According to a second aspect, the invention also relates to a transmission unit adapted to transmit a sequence of sets of data to an access point of a wireless communication network through at least one radio communication channel, comprising: means for determining, for each set of data, a value of at least one parameter to be used by the communication device for transmission of said set of data; means for transmitting said set of data, through the at least one radio communication channel, according to the value of said at least one parameter. The transmission unit is such that the means for determining, for each set of data, said at least one value are adapted to select, according to the order of said set of data in the sequence, in a list of predetermined values of said at least one parameter, a corresponding value. Furthermore, the number of occurrences of each predetermined value in the list being determined according to a probability that the selection of said predetermined value leads to a transmission of a set of data with at least one quality criteria fulfilling at least one predefined condition.

According to a third aspect, the invention also relates to a communication device provided with a transmitter unit according to the aforementioned second aspect, for accessing wirelessly a communication network through access points. The communication device is for example powered by an autonomous limited energy source, such as a battery or an accumulator.

According to a fourth aspect, the invention also relates to a wireless communication system comprising a communication network that can be accessed wirelessly through access points and at least one communication device according to the aforementioned third aspect.

According to a fifth aspect, the present invention also concerns a computer program that can be downloaded from a communication network and/or stored on a medium that can be read by a transmission unit according to the aforementioned second aspect. This computer program comprises instructions for causing implementation of the aforementioned method, when said program is run by the processor. The present invention also concerns information storage means, storing a computer program comprising a set of instructions causing implementation of the aforementioned method, when the stored information is read from said information storage means and run by a processor.

Figure 2:
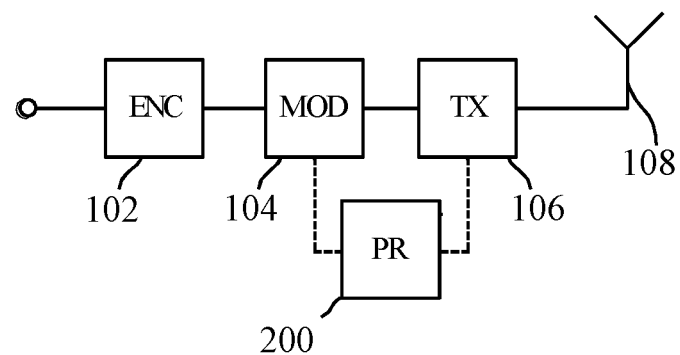
Figure 3:
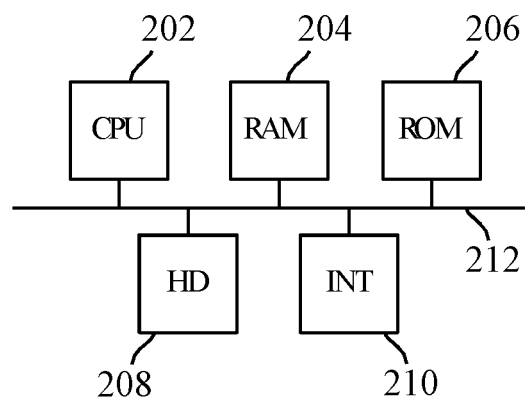
Figure 4A:
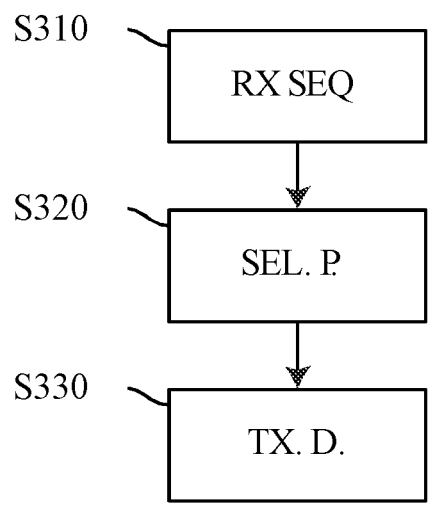
Figure 4B:
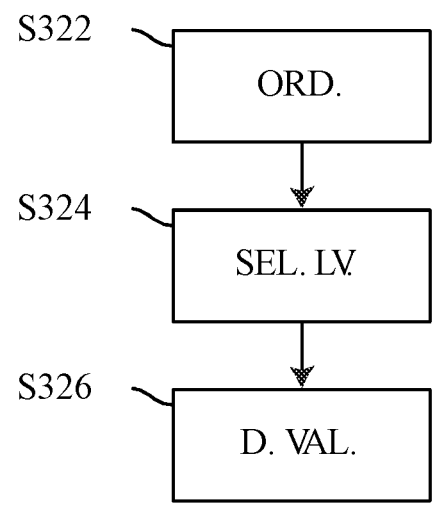
Figure 4C:
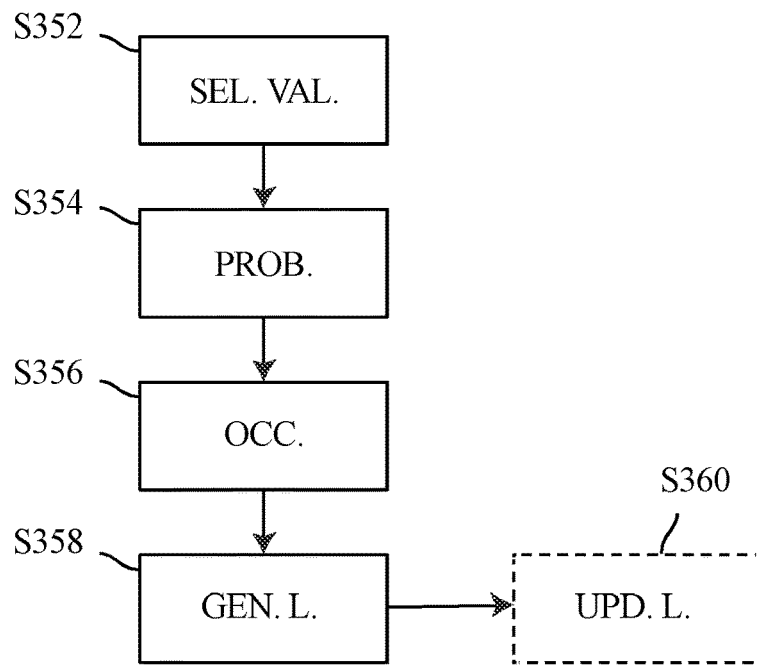
Figure 5:
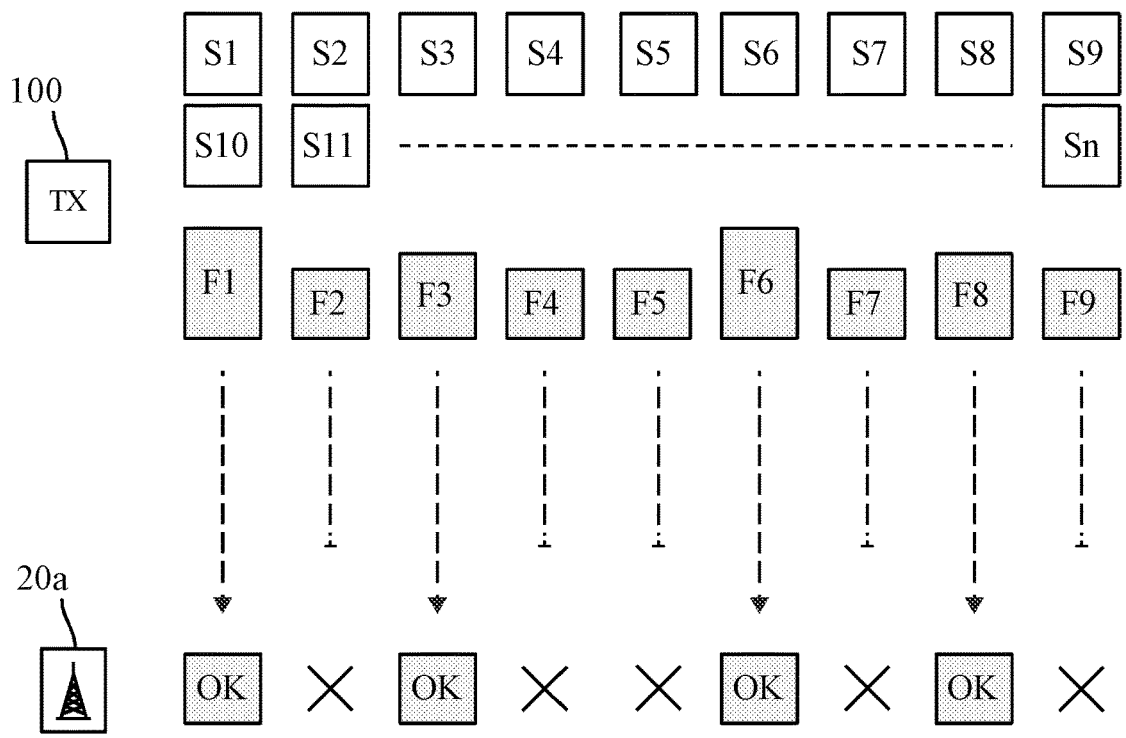
Figure 6A:
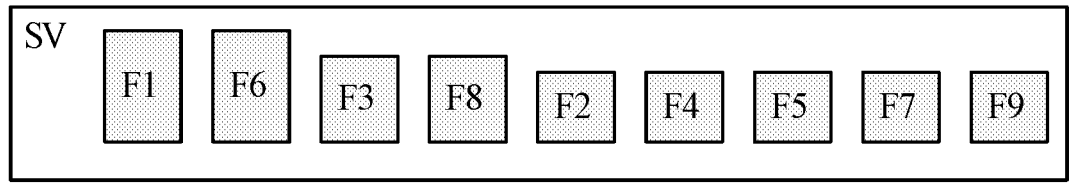
Figure 6A:
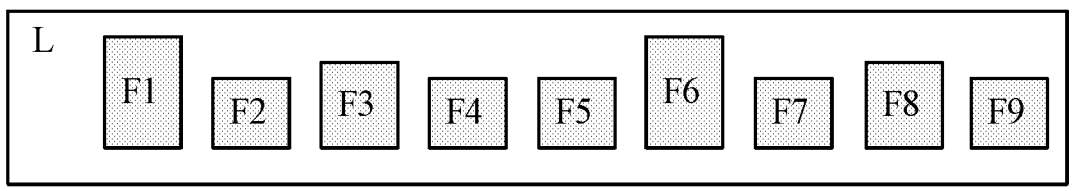
Figure 6B:
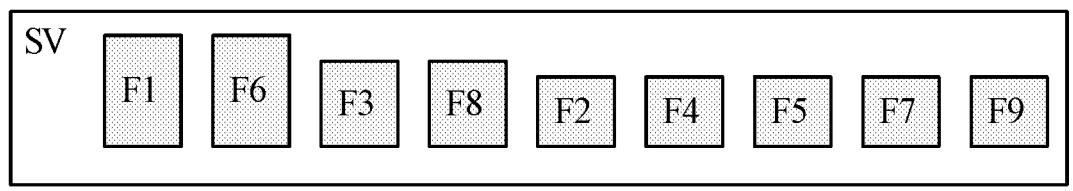
Figure 6B:
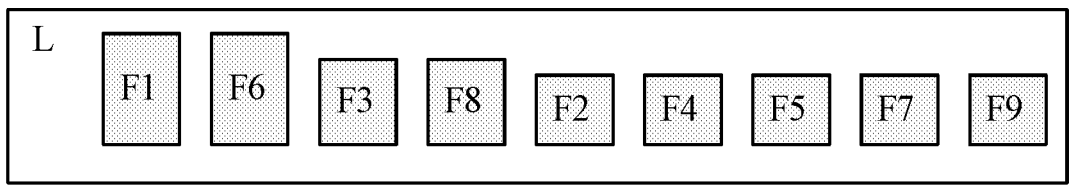

The characteristics of the invention will emerge more clearly from the following description of an example of an embodiment of the invention, said description being made with reference to the accompanying drawings, among which:

FIG. 1 schematically represents a wireless communications system comprising a communication device in which the present invention may be implemented;

FIG. 2 schematically represents a transmitter unit of the communication device;

FIG. 3 schematically represents an architecture of a processing device of the transmitter unit;

FIG. 4A schematically represents a method for transmitting a sequence of sets of data, to the access point, through at least one radio communication channel;

FIG. 4B schematically represents a method for determining the value of at least one parameter to be used by the transmitter unit for transmitting the sets of data;

FIG. 4C schematically represents a method for building the list of predetermined values of the at least one parameter to be used by the transmitter unit;

FIG. 5 schematically represents an example of the execution of the method for transmitting a sequence of sets of data;

FIG. 6A schematically represents an example of the list of all the possible values of the set, ordered according to a round-robin algorithm; and FIG. 6B schematically represents an example of the list of all the possible values of the set, sorted according to their respective numerical values.

FIG. 1 schematically represents a wireless communications system in which the present invention may be implemented. The wireless communication system comprises a communication network 10 that can be accessed wirelessly through access points 20a, 20b, 20c. Each access point 20a, 20b, 20c offers services of the wireless communications system to communication devices 30. The access points 20a, 20b, 20c are for example gateways. Typically, a communication device 30 is a terminal adapted to access the communication network 10 by establishing a radio communication link with one of the access points 20a. The radio communication link comprises at least one radio uplink, i.e. a transmission path from the communication device 30 to one of the access points (such as the access point 20a). The radio communication link may further comprise at least one radio downlink, i.e. a transmission path from one of the access points (such as the access point 20a) to the communication device 30. Each radio communication link uses one or a plurality of radio channels shared out with a plurality of other communication devices. The communication device 30 may be for instance a mobile terminal. The communication device 30 comprises a transmitter unit 100 adapted to transmit sets of data, on the radio uplink.

FIG. 2 schematically represents the transmitter unit 100. It comprises an encoding unit 102 that converts data to be transmitted into a suitable coded form so as to be transmitted on the radio uplink. For instance, the data can be converted into coded bits with redundancy according to an error correcting code structure, and which are possibly interleaved altogether. The transmitter unit 100 further comprises a modulating unit 104 that converts the coded data into modulation symbols according to a given modulation scheme. More particularly, the modulating unit 104 is adapted to convert the coded data into modulation symbols according to a spreading factor SF to be obtained. In a Code Division Multiple Access modulation scheme, for instance, the spreading factor may be defined as a ratio between the chip rate of a code (the number of pulses per second at which the code is transmitted) and the symbol rate (the number of symbol changes or waveform changes or signalling events, made to the transmission medium per second). The transmitter unit 100 further comprises a physical transmission unit 106, coupled to at least one antenna 108, which is configured to send the modulation symbols on the corresponding radio channels. The transmission unit 106 is adapted to control the output power of its radio transmissions according to an output power target. The transmitter unit 100 further comprises a processing device 200, coupled to the modulating unit 104 and to the transmission unit 106.

FIG. 3 schematically represents an architecture of the processing device 200. According to the shown architecture, the processing device comprises the following components interconnected by a communications bus 212: a processor, microprocessor, microcontroller or CPU (Central Processing Unit) 202; a RAM (Random Access Memory) 204; a ROM (Read-Only Memory) 206; a HDD (Hard-Disk Drive) or an SD (Secure Digital) card reader 208, or any other device adapted to read information stored on storage means; a communication interface 210.

The communication interface 210 allows the processing device 200 to communicate with the modulating unit 104 and the transmission unit 106.

CPU 202 is capable of executing instructions loaded into RAM 204 from ROM 206 or from an external memory, such as an SD card or the HDD. After the processing device 200 has been powered on, CPU 202 is capable of reading instructions from RAM 204 and executing these instructions. The instructions form one computer program that causes CPU 202 to perform some or all of the steps of the algorithms described hereafter with regard to FIGS. 4A, 4B, 4C, 5, 6A and 6B.

Any and all steps of the algorithms described hereafter with regard to FIGS. 4A, 4B, 4C, 5, 6A and 6B, may be implemented in software by execution of a set of instructions or program by a programmable computing machine, such as a PC (Personal Computer), a DSP (Digital Signal Processor) or a microcontroller; or else implemented in hardware by a machine or a dedicated component, such as an FPGA (Field-Programmable Gate Array) or an ASIC (Application-Specific Integrated Circuit).

FIG. 4A schematically represents a method, performed by the transmitter unit 100, for transmitting a sequence of sets of data, to the access point 20a, through at least one radio communication channel. The method according to the invention is not based on the assumption that the transmitter unit 100 has prior knowledge of the uplink radio conditions on the at least one radio communication channel. In fact, the transmitter unit 100 is likely to have no access to the current uplink radio conditions. Typically, the transmitter unit 100 is not configured to measure a signal to noise ratio or power of signals potentially received by the access point 20a, or no downlink exists from the access point 20a to the communication device 30. Moreover, even when such downlink exists, the wireless communication system may not be necessarily adapted to provide information related to said uplink radio conditions through said downlink.

In step S310, the processing device 200 obtains a sequence SEQ of sets of data to be transmitted. The whole sequence SEQ can be obtained at once. Alternatively, the sequence SEQ can be obtained in several parts, or even continuously.

In step S320, for each set of data in the sequence SEQ, a value of at least one parameter to be used by the transmitter unit 100 for transmitting said set of data is determined by the processing device 200.

In a first example, the at least one parameter is the spreading factor SF used by the modulating unit 104 to convert data into modulation symbols.

In a second example, the at least one parameter is the output power of the transmission unit 106.

Then, in step S330, each set of data in the sequence SEQ is transmitted, by the transmitter unit 100, through the at least one radio communication channel, according to the values of the at least one parameter, as determined in step S320.

In the first example, the processing device 200 is configured to control the modulating unit 104 so as to convert each set of data into modulation symbols using the corresponding values of the spreading factor SF determined in step S320.

In the second example, the processing device 200 is configured to control the transmission unit 106 so as to transmit each set of data using the corresponding values of the output power determined in step S320.

FIG. 4B schematically represents a method, performed by the transmitter unit 100, for determining the value of at least one parameter to be used by the transmitter unit 100 for transmitting the sets of data, during step S320.

In step S322, an order of each set of data in the sequence SEQ is determined. The order of each set of data in the sequence may be defined for example according to its position in the sequence. The order of each set of data in the sequence may also be defined for example according to the time when said set of data was received by the transmission unit. The order of each set of data in the sequence may also depend on information related to a priority of the corresponding set of data.

Then, in step S324, a list L of predetermined values of the at least one parameter to be used by the transmitter unit 100, is obtained. The list L may be retrieved by the transmitter unit 100 from one of its storage means 208, said list L being pre-stored during a manufacturing process and/or during a configuration operation of the transmitter unit. Alternatively, the list L may be received by the transmitter unit 100 from a device of the wireless communications system, for example during an over-the-air configuration operation. The list L may be different from one location, e.g. one country, to another location, e.g. another country. For instance, frequencies in use may be a variable to address a specific usage, or to limit interference, or to avoid relying on crowded transmission channels, or to meet requirements specified by regulation considerations (channel frequencies are typically different from world regions to other world regions).

In the first example, said list L is a list of predetermined values of the spreading factor SF used by the modulating unit 104 to convert data into modulation symbols.

In the second example, said list L is a list of predetermined values of the output power of the transmission unit 106.

In step S326, according to its order in the sequence SEQ, a corresponding predetermined value in the list L is selected for each set of data.

FIG. 4C schematically represents a method for building the list L of predetermined values of the at least one parameter to be used by the transmitter unit 100, as obtained in step S324.

In step S352, a set SV of possible values of the at least one parameter to be used by the transmitter unit 100 is determined.

For instance, the set SV is established beforehand following a campaign of measurements and/or experimentations and/or simulations related to the wireless communications system and its radio environment.

In the first example, the set SV lists the possible values of the spreading factor SF to be used by the modulating unit 104 to convert data into modulation symbols.

In the second example, the set SV lists the possible values of the output power of the transmission unit 106.

In step S354, for each possible value of the set SV determined in the step S352, a probability Pr that the use of said possible value leads to a transmission of data, with at least one quality criteria fulfilling at least one predefined condition, is computed.

In an embodiment, the probability Pr is determined by computing the probability that the use of said possible value leads to a transmission of data, with at least one QoS indicator I fulfilling at least one predefined QoS condition C. The QoS indicator I and the corresponding QoS condition C may be a performance associated to a given quality criteria, for example respectively a frame error rate of a transmission of data and a maximum threshold value of the frame error rate, or respectively a power consumption of the communication device and a maximum threshold value of the power consumption. The QoS indicator I may also be a combination of performances, each associated to a given quality criteria. For example, the QoS indicator I and the corresponding QoS condition C are respectively a frame error rate of a transmission of data and an acceptable range of values of the frame error rate. According to another example, the QoS indicator I and the corresponding QoS condition C are respectively a power consumption of the communication device and a maximum threshold value of the power consumption.

For instance, the probability Pr can be determined beforehand following a campaign of measurements and/or experimentations and/or simulations related to the wireless communications system and its radio environment.

In step S356, a number n of occurrences in the list L is determined for each possible values of the set SV. For a given possible value of the set SV, the number n of occurrences in the list L is determined according to the corresponding probability Pr calculated in step S354. For example, if the probability Pr1 related to a first possible value PV1 of the set SV is greater than the probability Pr2 related to a second possible value PV2 of the set SV, then the number $n_1$ of occurrences in the list L of the first possible value PV1 will be greater than the number $n_2$ of occurrences in the list L of the second possible value PV2.

In step S358, the list L is built so as that the number of occurrences of each possible values of the set SV equals the corresponding number n of occurrences determined during the step S356.

In an optional step S360, the list L is updated. The optional step S360 may be triggered on a regular basis. The optional step S360 may also be triggered upon a change of the geographical position of the transmitter unit 100. The optional step S360 may also be triggered upon reception of update information transmitted by one of the access points. For instance, the update information can be propagation statistics collected by the access point, for example information related to the usage of the output power or spreading factor. The list L may be updated by executing the steps S352, S354, S356 and S358 with new or additional information, for instance, new possible values in the set SV, and/or new information related to the probability Pr.

According to an embodiment, illustrated on FIG. 6A, the list L is built with all the possible values of the set SV ordered according to a round-robin algorithm. In this example, the set SV comprises nine possible values F1, F2, . . . , F9. The possible value F1 is equal to the possible value F6. The possible value F3 is equal to the possible value F8. The possible values F2, F4, F5, F7 and F9 are all equal. In the list L, all the possible values F1, F2, . . . , F9 are included, and are sorted so that each value in a group of equal possible values is spread in the list L. Typical Round-Robin algorithms can be used to perform such a spreading.

According to another embodiment, illustrated on FIG. 6B, the list L is built with all the possible values of the set SV sorted according to their numerical value. In this example, the set SV comprises nine possible values F1, F2, . . . , F9. The possible value F1 is equal to the possible value F6. The possible value F3 is equal to the possible value F8. The possible values F2, F4, F5, F7 and F9 are all equal. In the list L, all the possible values F1, F2, . . . , F9 are included, and are sorted by descending order of their numerical value. In this example, the possible values F1 and F6 are greater than the possible values F3 and F8, and the possible values F3 and F8 are greater than the possible values F2, F4, F5, F7, F9.

An example of execution of the method for transmitting the sequence SEQ of sets of data is now described, referring to FIG. 5. In step 310, the sequence SEQ comprising a number n of sets of data S1, S2, . . . , Sn is obtained. In step S322, the order of each of the sets of data S1, S2, . . . , Sn in the sequence SEQ is determined: the set S1 is the first set, the set S2 is the second set, . . . and the set n is the $n^{th}$ set. In step S324, the list L of predetermined values F1, F2, . . . , F9 of the spreading factor SF, used by the modulating unit 104 to convert data into modulation symbols, is obtained. In step S326, according to the order of each of the ten sets of data S1, S2, . . . , Sn, a corresponding predetermined value F1, F2, . . . , F9 in the list L is selected. For example, a simple rule for associating a predetermined value of the list L to a set of data according to its order in the sequence SEQ, is to associate the predetermined value F1 to the set S1, the predetermined value F2 to the set S2, . . . and the predetermined value F9 to the set S9. Once each predetermined values of the list L have been associated to one set, the process restarts again with the first value of the list L, i.e. the predetermined value F1 is associated to the set S10. Then, in the step S330, each set of data S1, S2, Sn is transmitted, by the transmitter unit 100 according to the corresponding value F1, F2, . . . , F9 of the spreading factor SF, determined in step S320. Hence, the set of data S1 will be transmitted, using a spreading factor SF which value is equal to F1, the set of data S2 using a spreading factor SF which value is equal to F2, etc. In this example, the transmissions of the sets of data S1, S3, S6, S8 and S10 using respectively the values F1, F3, F6, F8 and F10 for the spreading factor SF are received correctly by the access point 20a. By contrast, the transmissions of the sets of data S2, S4, S5, S7 and S9 using respectively the values F2, F4, F5, F7 and F9 for the spreading factor SF are not received or received incorrectly by the access point 20a.

Another detailed example of the execution of the method, performed by the transmitter unit 100, for transmitting the sequence SEQ of sets of data, to the access point 20a, through at least one radio communication channel, will now be described.

The transmitter unit 100 embedded in the communication device 30 has to transmit the sequence SEQ of sets of data. The modulating unit 104 of the transmitter unit 100 is adapted to convert the coded data into modulation symbols according to one of the following spreading factors SF: 7, 8, 9, 10, 11 or 12 belonging to a set SV of spreading factors. The power consumption c of the transmitter unit 100 depends on the actual spreading factor SF used to transmit the data. Consequently, we will denote $c_7$, $c_8$, $c_9$, $c_{10}$, $c_{11}$, $c_{12}$, where $c_x$ stands for the current consumption of the device when a data packet is transmitted with SF=x. The probability $p_x$ is the probability that a spreading factor SF=x in the wireless communication system environment is optimal to be used by the transmitter unit 100 to transmit data, with respect to a criteria. In the present example, we will have the following probabilities: $p_7$, $p_8$, $p_9$, $p_{10}$, $p_{11}$, $p_{12}$. The criteria used to determine if a given spreading factor can be considered as optimal, may relate, in this example, to the probability of an error in the received set of data or packets at the access point, and to an actual energy consumption. Usually, the error probability is lower for higher spreading factors SF, and the actual energy consumption is lower when lower spreading factors SF are used. Consequently, it is generally optimal to use, in this example, the lowest spreading factors SF that allow data to be received by the access point. Any lower spreading factor SF would potentially lead to the reception of corrupted data. Any higher spreading factor SF would lead to the correct reception of data by the access point, but the communication device would unnecessarily consume additional energy.

The probabilities $p_7$, $p_8$, $p_9$, $p_{10}$, $p_{11}$, $p_{12}$ may be estimated through experimentations, simulations and/or modelling.

For example, there can be a measurement campaign, from a particular geographical location in the environment of the wireless communication system, performed with a device, sensibly similar to the communication device, adapted to transmit data with the following spreading factors SF: 7, 8, 9, 10, 11, 12. Based on the received data on the access points, it is possible to determine which is the optimal spreading factor to use at this particular geographical location, in the sense of the criteria defined above.

Alternatively, there may be a measurement campaign, from a particular geographical location in the environment of the wireless communication system, performed with a device, sensibly similar to the communication device, adapted to transmit data with the highest spreading factor SF=12. Based on the received data on the access points, by computing the radio uplink margin in demodulation, it is possible to determine the optimal spreading factor to use, assuming that using the spreading factor SF=N+1 adds 3 dB in the link budget compared to using a spreading factor SF=N.

These measurements may be repeated in various geographical locations in the environment of the wireless communication system. In both examples, the various geographical locations of measurements may be chosen according to typical geographical areas that are appropriate for specific use cases, thanks for example to the nature of the communication device.

Then the probability $p_x$ can be estimated as the ratio of number of geographical positions in the network where SF=x is the optimal spreading factor to use and the number of geographical positions where a measurement was performed.

The list L comprising a pre-determined sequence of spreading factors is now built. The number $n_x$ of occurrences in the list L of the value x for the spreading factor SF is hereafter denoted: $n_7, n_8, n_9, n_{10}, n_{11}, n_{12}$. The length N of the list L can be expressed as follows:

$$N = \sum_{i=7}^{12} n_i$$

The ratio $\alpha_i$ of occurrences in the list L of the value x for the spreading factor SF=i can be expressed as follows:

$$\alpha_i = \frac{n_i}{N}$$

To determine the values of $(\alpha_i)_{i=7,\ldots,12}$, based on the knowledge of $(p_i)_{i=7,\ldots,12}$ and $(c_i)_{i=7,\ldots,12}$, it is possible to perform the following steps. In the following example, as previously discussed, the criteria used to determine if a given spreading factor can be considered as optimal, relates to the probability of error in the received set of data or packets at the access point, and to an actual energy consumption. Consequently, the objective is to achieve, for the communication device, at a given geographical location in the environment of the wireless communication system, a trade-off where in average the number of packets that are incorrectly or not received by the access point are minimized, and the current consumption of said communication device is minimized. Said criteria may be expressed based on the metrics described hereafter. A first metric is a Packet Error Rate (PER) corresponding to the ratio of transmitted data packets according to a spreading factor SF lower than the optimal spreading factor SF to use at the geographical location of the communication device. Considering that said optimal spreading factor SF to use is equal to k, then the Packet Error Rate PER can be expressed as follows:

$$PER = \sum_{i=7}^{k-1} \alpha_i$$

A second metric is a measure of Over-Consumption (OC) corresponding to the actual energy consumption of the communication device when the latter is transmitting data with a spreading factor SF higher than the optimal spreading factor SF to use at the geographical location of the communication device. Considering that said optimal spreading factor SF to use is equal to k, then the measure of Over-Consumption can be expressed as follows:

$$OC = \sum_{i=k+1}^{12} \alpha_i c_i$$

Other metrics could have been chosen. For example, network capacity could be used as another metric, being also dependent upon the spreading factor SF in use by the communication devices.

Accordingly, the average Packet Error Rate E[PER] and the average Over-Consumption E[OC] can be expressed as follows:

$$E[PER] = \sum_{k=8}^{12} p_k \sum_{i=7}^{k-1} \alpha_i$$

$$E[OC] = \sum_{k=7}^{11} p_k \sum_{i=k+1}^{12} \alpha_i c_i$$

To build the list L, it is then possible to determine the vector $\alpha = (\alpha_7 \alpha_8 \alpha_9 \alpha_{10} \alpha_{11} \alpha_{12})^T$ that minimizes the function $f(\alpha) = E[PER] \cdot E[OC]$.

A gradient method can be used to that end for determining $\alpha$ such that:

$$\nabla(f(\alpha)) = \left( \frac{\partial f(\alpha_7)}{\partial \alpha_7} \frac{\partial f(\alpha_8)}{\partial \alpha_8} \frac{\partial f(\alpha_9)}{\partial \alpha_9} \frac{\partial f(\alpha_{10})}{\partial \alpha_{10}} \frac{\partial f(\alpha_{11})}{\partial \alpha_{11}} \frac{\partial f(\alpha_{12})}{\partial \alpha_{12}} \right)^T = 0$$

Once the list L has been determined or obtained, the transmission unit 100 transmits the successive sets of data in the sequence SEQ, using the values of the spreading factors stored in the list L, each spreading factor SF being repeated respectively $n_7, n_8, n_9, n_{10}, n_{11}, n_{12}$ times in the list L. The transmission unit is configured to maintain a pointer Pt indicating a position in the list L. Each time the transmission unit 100 has to send a set of data, it retrieves the value of the spreading factor SF identified by the pointer Pt, transmits said set of data using the retrieved value of the spreading factor SF, and moves the pointer to the next position in the list L.

The invention claimed is:

1. A method for transmitting a sequence of sets of data, from a communication device to an access point of a wireless communication network, through at least one radio communication channel, comprising:
    for each set of data, determining a value of at least one parameter to be used by the communication device for transmission of said set of data; and
    transmitting said set of data, through the at least one radio communication channel, according to the value of said at least one parameter;
    wherein, for each set of data, said at least one value is determined by selecting, according to the order of said set of data in the sequence, in a list of predetermined values of said at least one parameter, a corresponding value; and
    wherein, for each predetermined value in the list, the number of occurrences of each respective predetermined value in the list is determined according to a probability that the selection of said predetermined value leads to a transmission of a set of data with at least one quality criteria fulfilling at least one predefined condition thereby providing a solution for transmitting data, from the communication device to the access point of the wireless communication network, through the at least one radio communication channel, while maximizing quality of service without having access to information relating to uplink radio conditions, wherein the list of predetermined values of the at least one parameter, is built by:
 determining a set of possible values of the at least one parameter;
 for each possible value of the at least one parameter, computing a probability that the use of said possible value leads to a transmission of data, with at least one quality criteria fulfilling at least one predefined condition; and
 for each possible value of the at least one parameter, determining a number of occurrences in the list depending on said probability, wherein, for each possible value of the at least one parameter, the probability is computed using information related to the at least one quality criteria observed in and/or determined for various locations of an environment of the wireless communication network, and wherein, for each possible value of the at least one parameter, the probability is computed based on:
 the number of locations of the environment of the wireless communication network where said possible value leads to a transmission of data, with said at least one quality criteria fulfilling the at least one predefined condition; and
 the total number of the various locations where the information was observed and/or determined.

2. The method according to claim 1, further comprising updating the list of predetermined values of said at least one parameter, upon a change of the geographical position of the communication device, and/or upon reception of update information related to said at least one parameter transmitted by the access point and/or by another device coupled to the wireless communication network.

3. The method according to claim 1, wherein the list of predetermined values of the at least one parameter, is obtained, from a storage means of the communication device, in which the list has previously been stored during a manufacturing process and/or a configuration operation of the communication device.

4. The method according to claim 1, wherein the list is built with all the possible values sorted according to a round-robin algorithm or according to their numerical values.

5. The method according to claim 1, wherein the various locations of the environment of the wireless communication network are chosen according to the likelihood that the communication device will be positioned in said locations.

6. The method according to claim 1, wherein the at least one predefined condition relates to the output power of the communication device.

7. The method according to claim 1, wherein the at least one predefined condition relates to information related to an error rate of transmissions of data from the communication device to the access point.

8. The method according to claim 1, wherein the value of at least one parameter to be used by the communication device for transmission of said set of data relates to a spreading factor to be used by the communication device to convert data into modulation symbols.

9. A non-transitory information storage medium comprising computer program instructions causing a processor of a communication device to perform the method according to claim 1, when said computer program instructions are read and executed by the processor.

10. A transmission unit adapted to transmit a sequence of sets of data, to an access point of a wireless communication network, through at least one radio communication channel, comprising:
 means for determining, for each set of data, a value of at least one parameter to be used by the communication device for transmission of said set of data;
 means for transmitting said set of data, through the at least one radio communication channel, according to the value of said at least one parameter;
 wherein the means for determining, for each set of data, said at least one value are adapted to select, according to the order of said set of data in the sequence, in a list of predetermined values of said at least one parameter, a corresponding value; and
 wherein, for each predetermined value in the list, the number of occurrences of each respective predetermined value in the list is determined according to a probability that the selection of said predetermined value leads to a transmission of a set of data with at least one quality criteria fulfilling at least one predefined condition thereby providing a solution for transmitting data, from the communication device to the access point of the wireless communication network, through the at least one radio communication channel, while maximizing quality of service without having access to information relating to uplink radio conditions, wherein the list of predetermined values of the at least one parameter, is built by:
 determining a set of possible values of the at least one parameter;
 for each possible value of the at least one parameter, computing a probability that the use of said possible value leads to a transmission of data, with at least one quality criteria fulfilling at least one predefined condition; and
 for each possible value of the at least one parameter, determining a number of occurrences in the list depending on said probability, wherein, for each possible value of the at least one parameter, the probability is computed using information related to the at least one quality criteria observed in and/or determined for various locations of an environment of the wireless communication network, and wherein, for each possible value of the at least one parameter, the probability is computed based on:
 the number of locations of the environment of the wireless communication network where said possible value leads to a transmission of data, with said at least one quality criteria fulfilling the at least one predefined condition; and
 the total number of the various locations where the information was observed and/or determined.

11. A communication device provided with a transmitter unit according to claim 10 for accessing wirelessly a communication network through access points.

12. A communication device according to claim 11, wherein said communication device is powered by an autonomous limited energy source.

13. A wireless communication system comprising a communication network that can be accessed wirelessly through access points and at least one communication device according to claim 12.

* * * * *